(12) United States Patent
Fels et al.

(10) Patent No.: US 6,300,983 B1
(45) Date of Patent: Oct. 9, 2001

(54) ELECTRONIC KALEIDOSCOPIC APPARATUS CAPABLE OF FORMING KALEIDOSCOPIC IMAGE CONTAINING IN SITU IMAGE OF OBSERVER HIMSELF

(75) Inventors: Sidney Sol Fels; Kenji Mase, both of Kyoto (JP)

(73) Assignee: ATR Media Integration & Communication Research Laboratories, Kyoto (JP)

( * ) Notice: Subject to any disclaimer, the term of this patent is extended or adjusted under 35 U.S.C. 154(b) by 0 days.

(21) Appl. No.: 08/965,243

(22) Filed: Nov. 6, 1997

(30) Foreign Application Priority Data

Nov. 6, 1996 (JP) .................................... 8-293713

(51) Int. Cl.$^7$ .................................... H04N 5/262
(52) U.S. Cl. ............................ 348/580; 348/578
(58) Field of Search .................. 348/578, 580, 348/571, 553, 584, 239; 358/22, 160, 183; H04N 5/262, 9/74

(56) References Cited

U.S. PATENT DOCUMENTS 4,247,181   1/1981   Innes-Brown et al. .

FOREIGN PATENT DOCUMENTS

0437074 * 7/1991 (EP) .
2277226  10/1994 (GB) .

OTHER PUBLICATIONS

Fels et al., "MusiKalscope: A Graphical Musical Instrument", Proceedings IEEE International Conference of Multimedia Computing and Systems '97, Ottawa, Ont., Canada, Jun. 3–6, 1997, IEEE Comput. Soc., USA, pp. 55–62, XP–002059424.

Pickover et al., "Electronic Kaleidoscopes for the Mind", Computer Graphics forum, Mar. 1992, vol. 12, No. 1., pp. 41–46, XP–002059425.

Poole, Alan W., "VIC Kaleidoscope" Compute. Journal for Progressive Computing, May 1983, vol. 5, No. 5, pp. 146–148, XP–002059426.

* cited by examiner

Primary Examiner—David E. Harvey
(74) Attorney, Agent, or Firm—McDermott, Will & Emery

(57) ABSTRACT

In an electronic kaleidoscopic apparatus, a kaleidoscopic image forming unit extracts an initial image fragment of a specified region on the basis of image information picked up by a video camera. In response to the shape of the initial image fragment, the kaleidoscopic image forming unit regards the initial image fragment as an original image and repeatedly inverts/duplicates an image signal in this shape for every obtained reflection pattern, thereby forming a kaleidoscopic image and outputting the same to a display unit.

9 Claims, 18 Drawing Sheets

FIG. 3
INPUT IMAGE
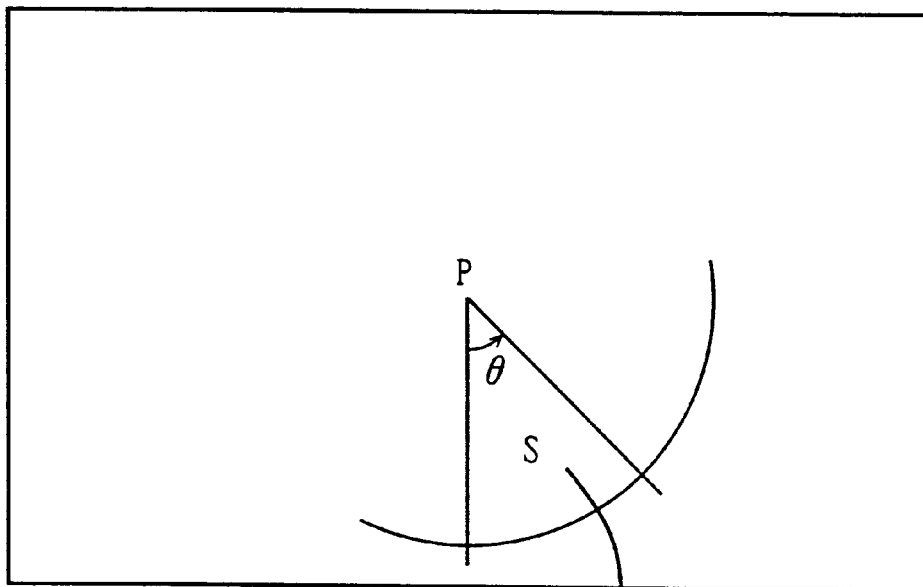
OUTPUT IMAGE
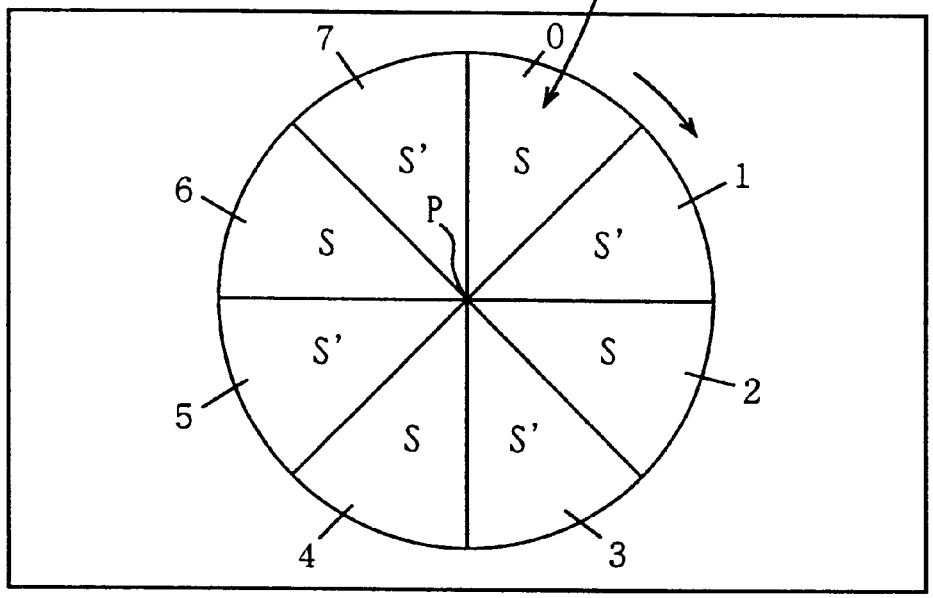

F I G. 5
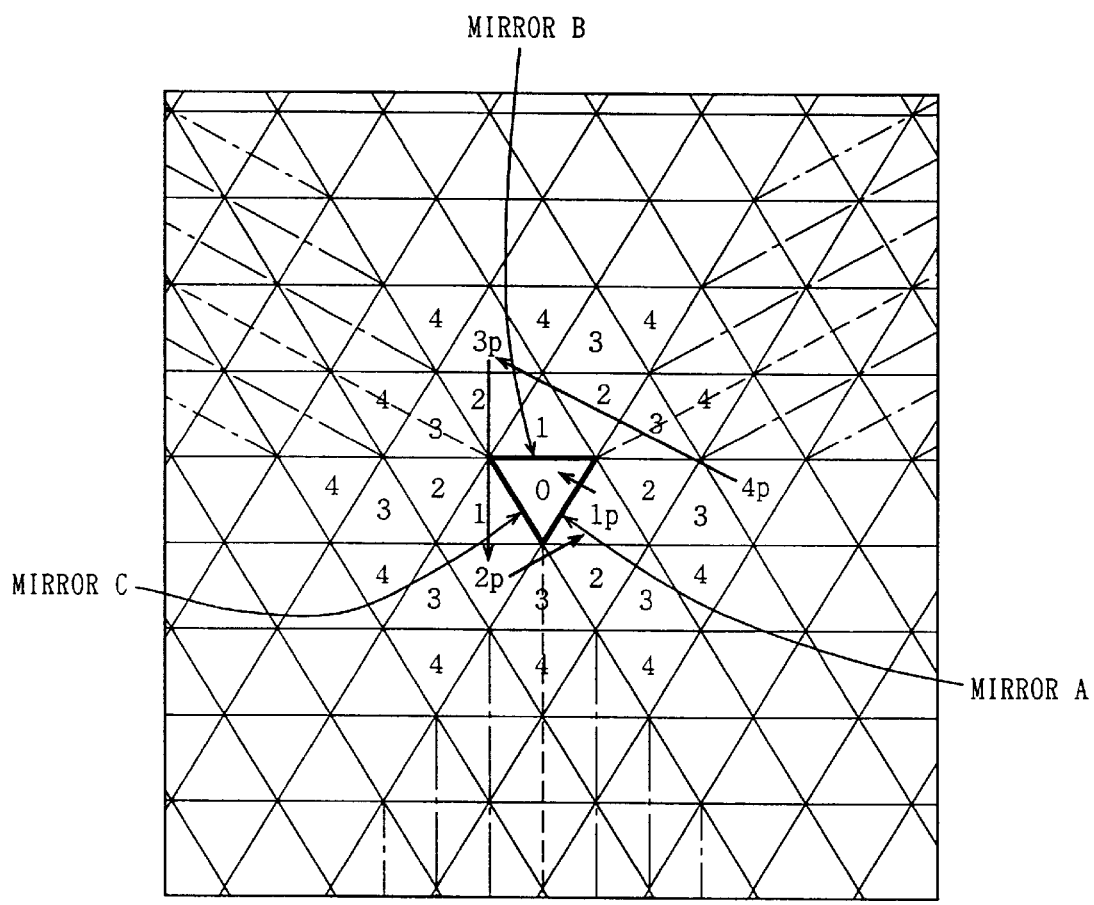

F I G. 7
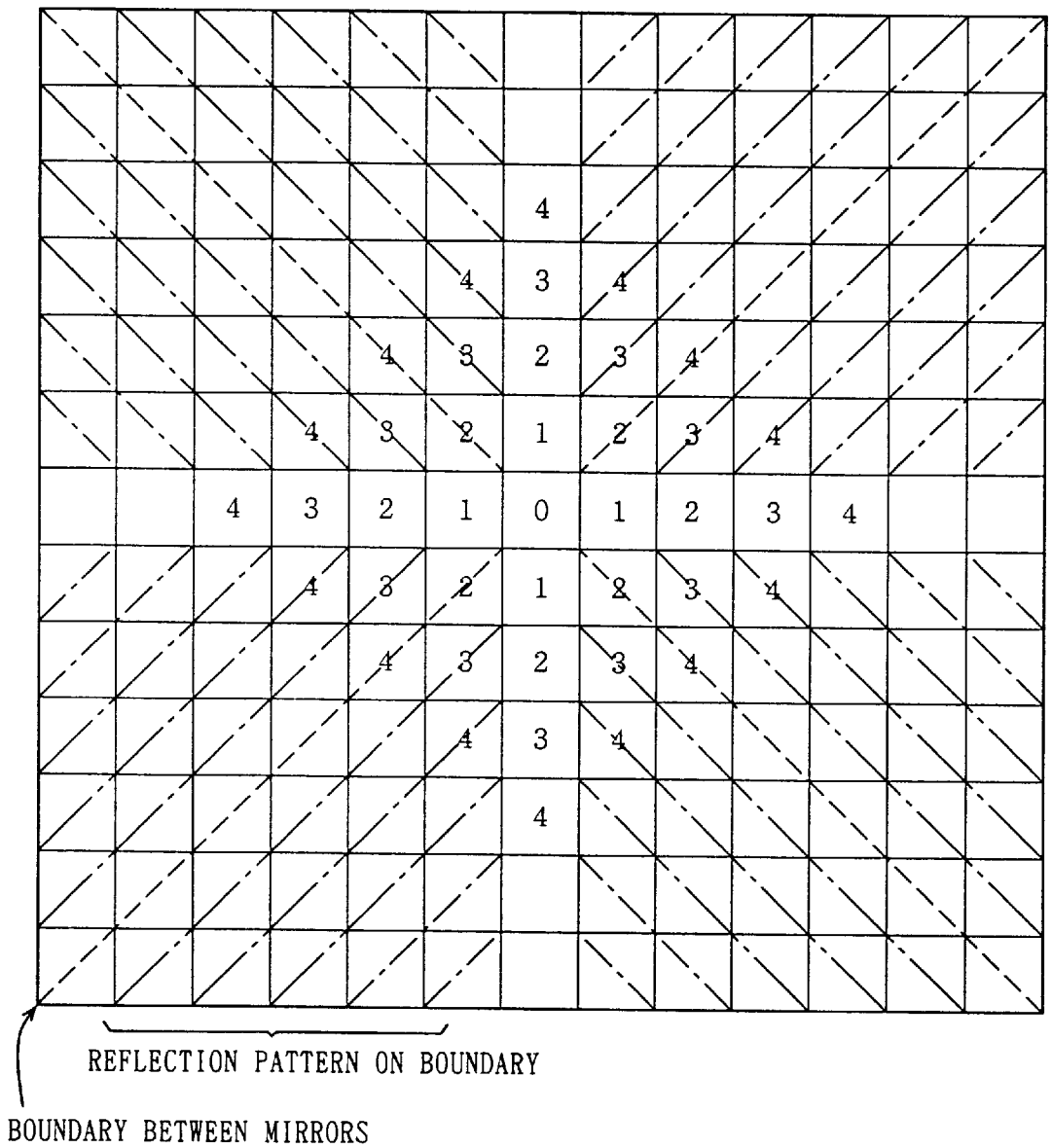
REFLECTION PATTERN ON BOUNDARY
BOUNDARY BETWEEN MIRRORS

ELECTRONIC KALEIDOSCOPIC APPARATUS CAPABLE OF FORMING KALEIDOSCOPIC IMAGE CONTAINING IN SITU IMAGE OF OBSERVER HIMSELF

BACKGROUND OF THE INVENTION

1. Field of the Invention

The present invention relates to an electronic kaleidoscopic apparatus which can supply picked-up image information with special image effects, particularly effects attained by a kaleidoscope.

2. Description of the Background Art

In general, a kaleidoscope which is employed as a toy or the like is in the form of a polygonal tube having a plurality of mirrors provided with inwardly directed reflecting surfaces, so that an image having a prescribed pattern is arranged on one side of the tube to be observed from the other side.

Therefore, it is impossible to reflect the observer of such a kaleidoscope in the image, for example.

While it is possible to cause interreflection through the mirrors for forming various patterns, the patterns can be changed only by a method of changing the object image.

On the other hand, there have been proposed various apparatuses for supplying picked-up image information with special effects by employing video signals as inputs. Such a video special effect apparatus can invert the overall image or implement cross-dissolve or wipe-off effects for smoothly switching two scenes, for example.

In the conventional kaleidoscope having the aforementioned structure, it is impossible to form a kaleidoscopic pattern with movement of a part of the observer's body or an object in his hand, for example. In relation to rehabilitation for a physical handicap or the like, expected is improvement of the rehabilitative effects through group work of a plurality of persons. In this group work, images of a plurality of persons having prescribed patterns in their hands respectively may be picked up by a video camera and projected on a screen, so that the persons can form an integrated pattern on the screen in cooperation with each other.

If the picked-up images are simply projected on the screen as such, however, there is a limit in improvement of the difficulty of the group work, and it is difficult to attract the interest of the persons in work. If the aforementioned kaleidoscopic patterns can be projected on the screen, it is advantageous for solving such problems.

In relation to background images for a dance performed on the stage or the like, for example, only images irrelevant to the dance can be presented or only monotonous images such as those displaying movement merely changing color tones of persons or the like can be formed in general.

Also in this case, it is possible to attain stage effects attracting the audience's interest if a complex geometric pattern can be displayed in synchronization with the dance or the like.

SUMMARY OF THE INVENTION

An object of the present invention is to provide an electronic kaleidoscopic apparatus which can form a kaleidoscopic image with movement of a part of the observer himself or an object in his hand.

Another object of the present invention is to provide an electronic kaleidoscopic apparatus which can add optical effects to a kaleidoscopic pattern by dynamically changing arrangement of mirrors or through image processing by a computer.

Still another object of the present invention is to provide an electronic kaleidoscopic apparatus which can output corresponding sounds for forming a kaleidoscopic pattern by combining an image with the sounds.

Briefly stated, the present invention provides an electronic kaleidoscopic apparatus, which comprises an image pickup unit, a kaleidoscopic image forming part, and a display unit.

The image pickup unit converts a picked-up optical image to a pickup signal. The kaleidoscopic image forming part receives the pickup signal, and forms an image signal of a kaleidoscopic pattern. This kaleidoscopic image forming part includes an image extracting part for receiving the pickup signal and cutting a partial pickup signal, corresponding to a specified polygonal region in the picked-up scene, out of the pickup signal in accordance with an external instruction, and an image processing part for successively repeating a step of forming a mirror image by inverting/duplicating an original image of the partial pickup signal about each edge, defining a symmetry axis, of the polygonal region on the mirror image formed in each step thereby forming an image signal of a kaleidoscopic image filling up a screen. The display unit outputs a corresponding image in response to an output of the kaleidoscopic image forming part.

According to another aspect of the present invention, an electronic kaleidoscopic apparatus comprises an image pickup unit, a kaleidoscopic image forming part, and a display unit.

The image pickup unit converts a picked-up optical image to a pickup signal. The kaleidoscopic image forming part receives the pickup signal, and forms an image signal of a kaleidoscopic pattern. This kaleidoscopic image forming part includes an image extracting part for receiving the pickup signal and cutting a partial pickup signal corresponding to a specified angle region about a specified central point in the picked-up scene out of the pickup signal in accordance with an external instruction, and an image processing part for successively inverting/duplicating an original image of the partial pickup signal along an edge, defining a mirror image symmetry axis, of a prescribed rotational direction about the central point along the prescribed rotational direction thereby forming an image signal of a kaleidoscopic pattern filling up a screen. The display unit outputs a corresponding image in response to an output of the kaleidoscopic image forming part.

Thus, a principal advantage of the present invention resides in that it is possible to form a kaleidoscopic image based on image information with respect to the whole body or a part of the observer for the kaleidoscopic image or an object in his hand.

Another advantage of the present invention resides in that it is possible to form an image further attracting the observer's concern or interest by combining an output of a sound signal with that of an image signal.

Still further advantage of the present invention resides in that it is also possible to form a kaleidoscopic image having various changes by adding an image subjected to computer graphics processing to actually picked-up image information.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a conceptual diagram illustrating an operation of the electronic kaleidoscopic apparatus 100 with two mirrors;

FIG. 5 is a conceptual diagram showing a process of forming a reflection pattern not intersecting with boundaries between mirrors;

FIG. 7 is a model diagram showing a process of forming a kaleidoscopic image with four mirrors;

DESCRIPTION OF THE PREFERRED EMBODIMENTS

Embodiment 1

Formation of Kaleidoscopic Image with Two Mirrors

Figure 1:
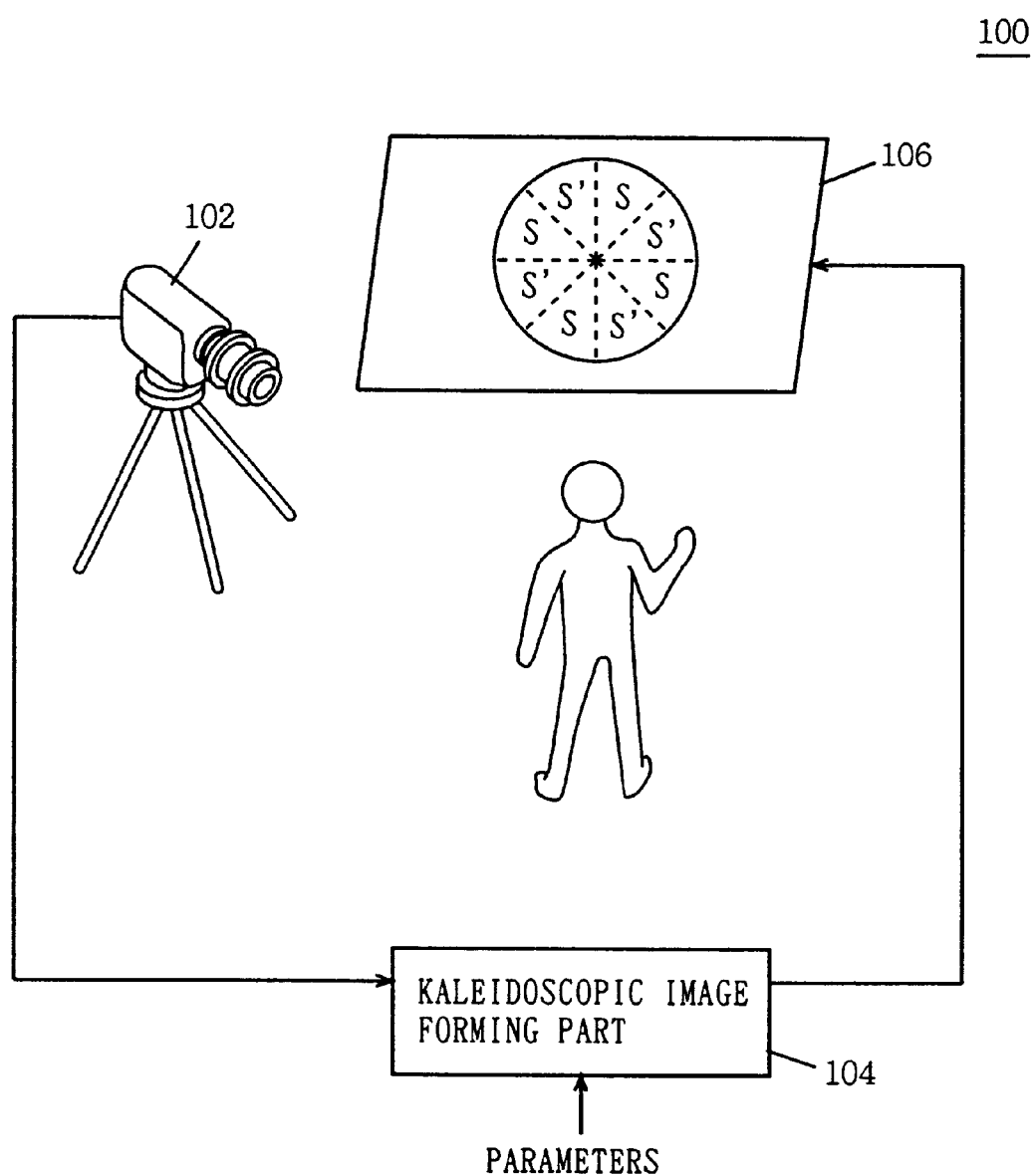
FIG. 1 is a schematic block diagram showing the structure of an electronic kaleidoscopic apparatus 100 according to an embodiment 1 of the present invention.

FIG. 1 is a schematic block diagram showing the structure of an electronic kaleidoscopic apparatus 100 according to an embodiment 1 of the present invention.

The electronic kaleidoscopic apparatus 100 includes a video camera 102 for picking up an image of an object, a kaleidoscopic image forming unit 104 for receiving a pickup signal from the video camera 102 and forming a kaleidoscopic image, and a display unit 106 for receiving an output of the kaleidoscopic image forming unit 104 and outputting a corresponding image.

Not only an optical display apparatus but also a tactile display apparatus are available as the display unit 106.

The video camera 102 is adapted to pick up a total or partial image of a person or an object held by this person.

The object of the video camera 102 is not restricted to the above, but any general image information is employable.

Figure 2:
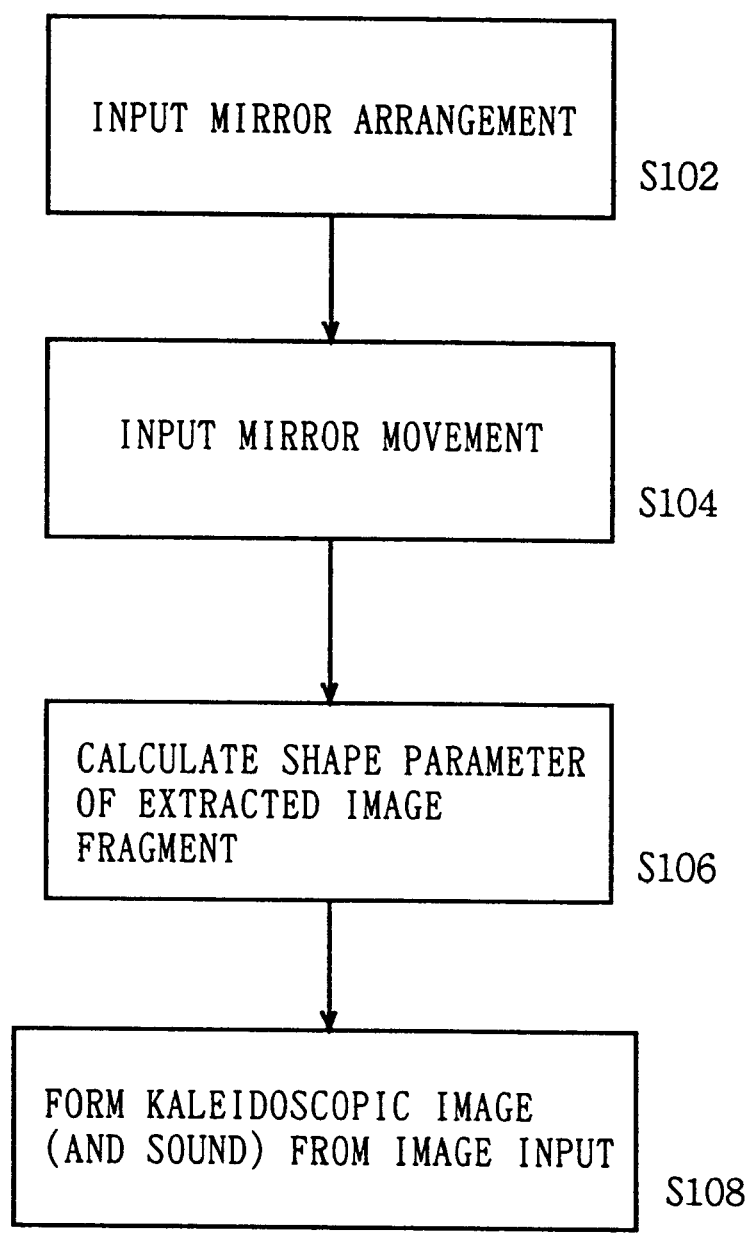
FIG. 2 is a flow chart schematically showing an operation of the electronic kaleidoscopic apparatus 100.

FIG. 2 is a flow chart showing a general flow of processing of the electronic kaleidoscopic apparatus 100.

First, mirror arrangement is inputted in the kaleidoscopic image forming unit 104 from the exterior (step S102).

Then, parameters of a set time interval for moving mirrors (for changing the angle between two mirrors) and the changed angle, in order to dynamically change the kaleidoscopic image (step S104).

Then, the kaleidoscopic image forming unit 104 calculates a shape parameter for cutting the partial pickup signal out of the pickup signal from the video camera 102 in response to the supplied mirror arrangement. This calculation is adapted to set the shape of the part to be cut off (extracted from) the pickup signal from the video camera 102 for forming the kaleidoscopic image (step S106).

Then, the kaleidoscopic image forming unit 104 extracts an image signal corresponding to the shape of an image fragment calculated at the step S106 from the pickup signal received from the video camera 102, and forms the image signal of a kaleidoscopic pattern (step S108).

FIG. 3 is a conceptual diagram for illustrating the step S108 of forming the kaleidoscopic image shown in FIG. 2.

The kaleidoscopic image forming unit 104 extracts a sectorial region S having a central angle $\theta$ about a central point P from the image which is picked up by the video camera 102 and inputted in the kaleidoscopic image forming unit 104 on the basis of the externally inputted parameters. In this case, the two edges opposed to each other at the central angle $\theta$ correspond to mirrors of a kaleidoscope.

Then, the kaleidoscopic image forming unit 104 forms the kaleidoscopic image on the basis of the region S cut out of the input image signal as follows: First, the kaleidoscopic image forming unit 104 arranges the image signal extracted from the region S on a position 0 about the central point P. Then, the kaleidoscopic image forming unit 104 successively forms inverted image information of the region S clockwise along arrow, for example. Namely, the kaleidoscopic image forming unit 104 forms an inverted image S' on a position 1 along an edge, defining a mirror image symmetry axis, of the region S in the clockwise rotational direction. Then, the kaleidoscopic image forming unit 104 forms inverted image information of the image S' on a position 2 along an edge, defining a mirror image symmetry axis, of the sectorial image S' in the rotational direction.

The kaleidoscopic image forming unit 104 successively repeats the aforementioned process of inversion/duplication for forming images with respect to all arrangement corresponding to single rotation, thereby completely forming the kaleidoscopic image.

In the example shown in FIG. 3, $\theta = 45°$ and hence the kaleidoscopic image forming unit 104 forms eight images, including the original image, in total. Assuming that symbol S represents the image information on the position 0 provided with the original image, the image information S' is formed on the position 1 by inverting the image information S. Further, the image information formed on the position 2 returns to the original image information S, due to the repetition of the inversion processing. The kaleidoscopic image forming unit 104 successively repeats such processing, thereby forming image information on respective positions 0 to 7 by alternately rotating the image information formed by inverting the original image S by corresponding angles.

In the example shown in FIG. 3, the kaleidoscopic image forming unit 104 can form an image corresponding to the pattern of a kaleidoscope by simply inverting the original image S and rotating the same about the central point P by prescribed angles.

As hereinabove described, it is possible to readily form the kaleidoscopic pattern by simply repeating inversion/duplication of the original image S extracted from the input image.

Formation of Kaleidoscopic Image with Three or More Mirrors

The above description has been made with reference to a method of forming a kaleidoscopic pattern corresponding to a conventional kaleidoscope provided with two mirrors.

In more general, there also exists a kaleidoscopic image formed by a kaleidoscope which is in the form of a polygonal pole having a plurality of mirrors provided with inwardly directed reflecting surfaces.

Figure 4:
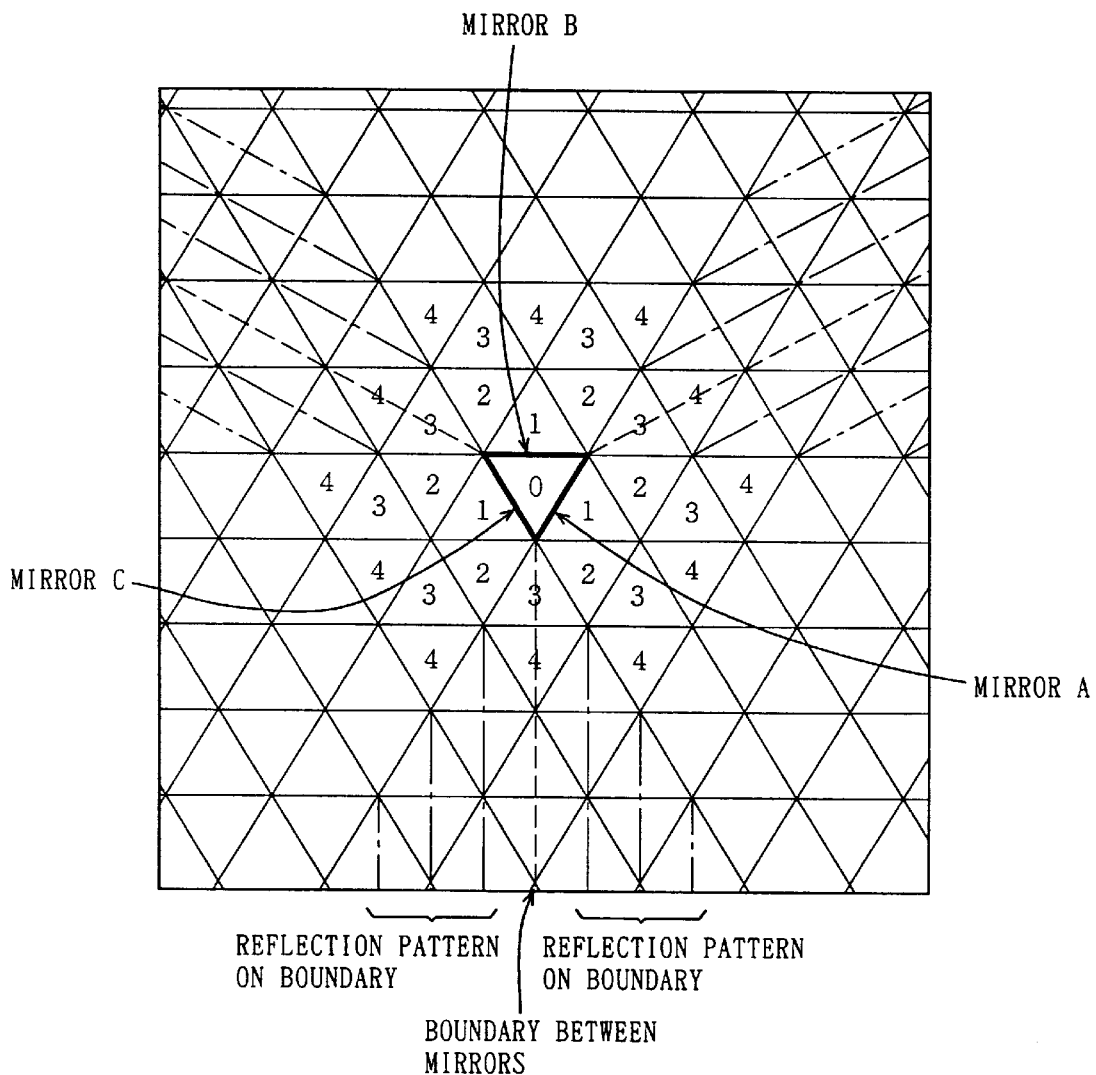
FIG. 4 is a model diagram showing a process of forming a kaleidoscopic image with three mirrors.

FIG. 4 is a conceptual diagram showing a kaleidoscopic image formed through three mirrors A, B and C which are arranged to define a triangular pole having an equilateral triangular bottom surface.

Referring to FIG. 4, numeral 0 represents an original image of an equilateral triangular shape defined by thick lines, and numeral 1 represents mirror images formed by the mirrors A, B and C reflecting the original image 0 respectively. The remaining numerical values correspond to the numbers of reflecting times, and represent mirror images formed by reflection patterns of the mirror images 1 through the mirrors A to C.

As shown in FIG. 4, the actual kaleidoscopic image includes boundaries (corresponding to the edges of the triangular pole) between the mirrors A to C shown by dotted lines and reflection patterns on the boundaries shown by one-dot chain lines.

Along these dotted lines and one-chain dot lines, the respective patterns are formed through different reflection paths. This is now briefly described.

FIG. 5 illustrates the reflection path of a pattern 4p not intersecting with the boundaries between the mirrors A, B and C and the reflection patterns thereon with reference to the original image 0, among the patterns formed by reflection.

The mirror A reflects the original image 0 thereby forming a first reflection pattern 1p, and the mirror C reflects this reflection pattern 1p thereby forming a second reflection pattern 2p. The mirror B reflects this reflection pattern 2p thereby forming a third reflection pattern 3p, and the mirror A reflects this reflection pattern 3p, thereby forming the reflection pattern 4p.

Figure 6:
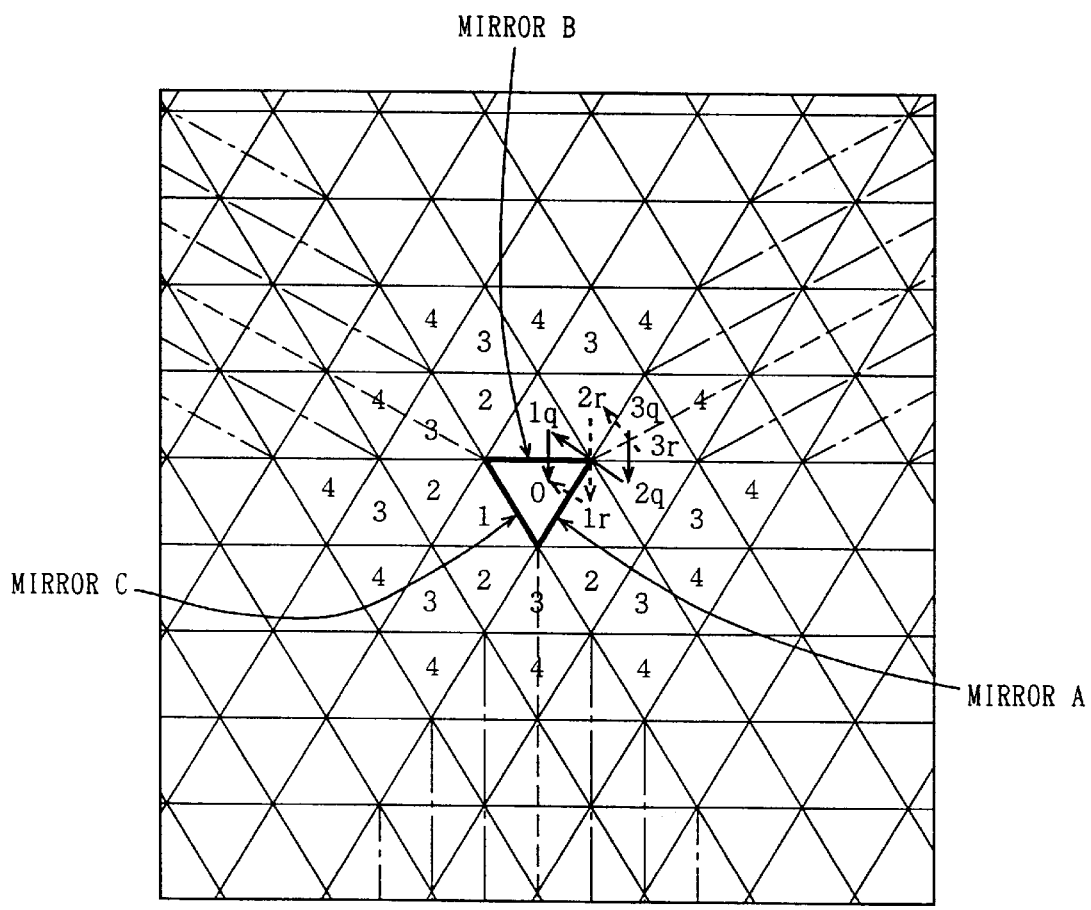
FIG. 6 is a conceptual diagram showing a process of forming reflection patterns intersecting with the boundaries between the mirrors.

FIG. 6 illustrates the reflection paths of patterns existing on the boundary between the mirrors A and B.

Referring to FIG. 6, numerals 3q and 3r represent reflection patterns formed through two paths along the boundary between the mirrors A and B.

With reference to the reflection pattern 3q, the mirror B reflects the original image 0 thereby forming a reflection pattern 1q, and the mirror A reflects this reflection pattern 1q thereby forming a reflection pattern 2q. Further, the mirror B reflects this reflection pattern 2q thereby forming the reflection pattern 3q.

On the other hand, the mirror B reflects a reflection pattern 1r formed by the mirror A reflecting the original image 0, and the mirror A reflects this reflection pattern 2r again thereby forming the reflection pattern 3r.

Also in case of electronically forming such a kaleidoscopic image formed by the aforementioned kaleidoscope which is in the form of a triangular pole, therefore, it is also possible to reproduce reflection of an actual optical image in fidelity as described above.

In the aforementioned method, however, calculation is so complicated that the forming rate is retarded. Therefore, this method is unsuitable for formation of a kaleidoscopic image in real time, for example.

Referring again to FIG. 4, it is possible to form the kaleidoscopic image by forming patterns in the following procedure with no regard to the boundaries between the mirrors A to C and the reflection patterns thereon:

The kaleidoscopic image forming unit 104 forms the reflection patterns 1 by inverting and duplicating the original image 0 along the respective edges, defining symmetry axes, of the equilateral triangle enclosing the original image 0. Then, the kaleidoscopic image forming unit 104 inverts and duplicates the reflection patterns 1 along edges, defining reflection symmetry axes, enclosing the reflection patterns 1, thereby forming the reflection patterns 2. Single edges of the reflection patterns 1 are in contact with the original image 0, and hence the kaleidoscopic image forming unit 104 preferentially displays the original image 0 with respect to inverted images formed to overlap with the original image 0. Alternatively, the kaleidoscopic image forming unit 104 can form the second reflection patterns under a rule of performing no inversion and duplication with respect to the region provided with the original image 0.

Then, the kaleidoscopic image forming unit 104 inverts and duplicates the second reflection patterns 2 along respective edges, defining symmetry axes, enclosing the same, thereby forming third reflection patterns 3. If any reflection patterns overlap with those having a smaller number of reflection times, the kaleidoscopic image forming unit 104 can form the third reflection patterns 3 by preferentially displaying the patterns having a smaller number of reflection times or performing no inversion and duplication on the regions provided with such patterns.

The kaleidoscopic image forming unit 104 successively repeats absolutely similar processing, for filling up the overall screen with the reflection patterns. Thus, it is possible to form a pattern equivalent to a kaleidoscopic pattern by simply repeating inversion and duplication of the original image pattern.

FIG. 7 is a conceptual diagram showing pattern formation with four mirrors.

As shown in FIG. 7, an actual kaleidoscopic image formed by a kaleidoscope having four mirrors includes boundaries between the mirrors shown by dotted lines and reflection patterns on the boundaries shown by one-dot chain lines. Similarly to the aforementioned kaleidoscopic pattern formed through three mirrors, it is possible to form an equivalent kaleidoscopic pattern by simply inverting and duplicating an original image 0 of a region having such boundary patterns.

Also in case of FIG. 7, the kaleidoscopic image forming unit 104 inverts and duplicates the original image 0 along four edges, defining symmetry axes, enclosing the original image thereby forming first reflection patterns 1, similarly to the case of FIG. 4. Then, the kaleidoscopic image forming unit 104 inverts and duplicates the reflection patterns 1 along four edges, defining symmetry axes, enclosing each pattern 1, thereby forming second reflection patterns 2. If any reflection patterns overlap with those having a smaller number of reflection times, the kaleidoscopic image forming unit 104 preferentially displays the patterns having a smaller number of reflection times or performs no reflection and duplication on the regions provided with such patterns, and successively repeats the aforementioned procedure.

Finally the kaleidoscopic image forming unit 104 forms a total pattern corresponding to a kaleidoscopic image by filling up the overall screen with inverted/duplicated patterns formed in the aforementioned manner.

Figure 8:
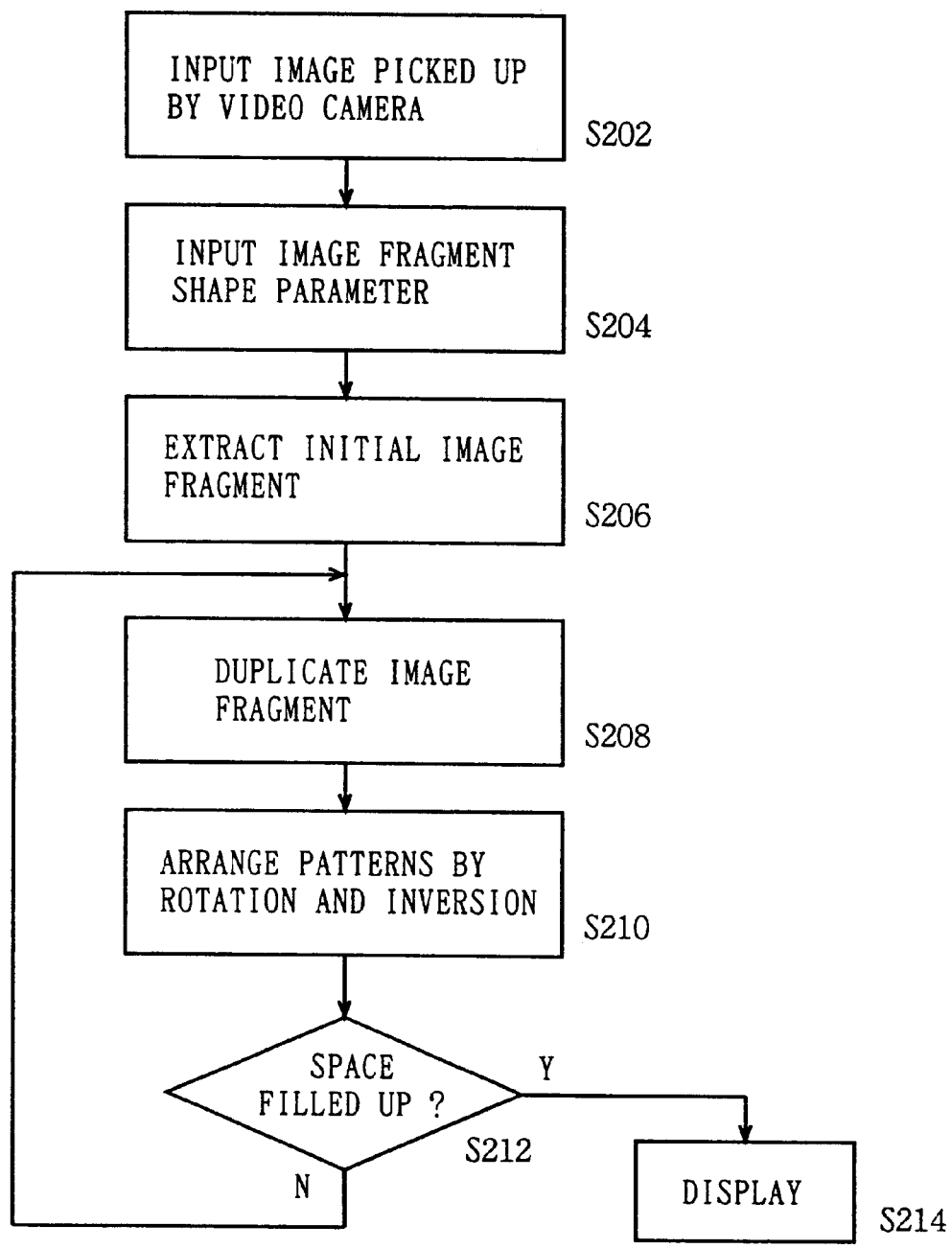
FIG. 8 is a flow chart illustrating an operation of a kaleidoscopic image forming unit 100.

FIG. 8 is a flow chart showing the flow of the aforementioned kaleidoscopic image formation.

First, an image signal picked up by the video camera 102 is inputted in the kaleidoscopic image forming unit 104 (step S202).

Then, a parameter for the shape of an image fragment forming an original image is inputted from the image signal (step S204).

Then, the kaleidoscopic image forming unit 104 extracts an initial image fragment on the basis of the inputted shape of the image fragment (step S206).

The kaleidoscopic image forming unit 104 may extract image information corresponding to the specified image fragment shape from image information of an arbitrary area obtained from the video camera 104, or convert the image information from the video camera 102 to the image fragment shape by morphing.

Then, the kaleidoscopic image forming unit 104 duplicates the image fragment (S208), and inverts and rotates the pattern to obtain a shape inverted along a symmetry axis (step S210).

Then, the kaleidoscopic image forming unit 104 determines whether or not an overall space is completely filled up (step S212), and outputs a corresponding image signal to the display unit 106 if the determination is of YES (step S214).

If the kaleidoscopic image forming unit 104 determines that the space is not yet completely filled up, on the other hand, the process returns to the step S208.

The kaleidoscopic image forming unit 104 repeats inversion/duplication of the original image (initial image) until the overall screen is filled up with reflection patterns.

The kaleidoscopic image forming unit 104 continuously repeats the aforementioned kaleidoscopic image forming operation, for outputting a kaleidoscopic image changing in real time to the display unit 106.

Namely, the kaleidoscopic image forming unit 104 repeats the processing from the input of the image by the video camera 104 up to the display shown in the flow chart at a video rate.

In the aforementioned case of an original image having an equilateral triangular or square shape, it is possible to fill up a two-dimensional space with no overlap. However, the shape capable of filling up a two-dimensional space is not restricted to an equilateral triangle or a square, but still another shape such as a right-angled triangle, for example, is also employable.

In case of an original image having a more general shape, however, it may be difficult to completely fill up a two-dimensional space with no overlap only by inverting and duplicating the original image.

Figure 9:
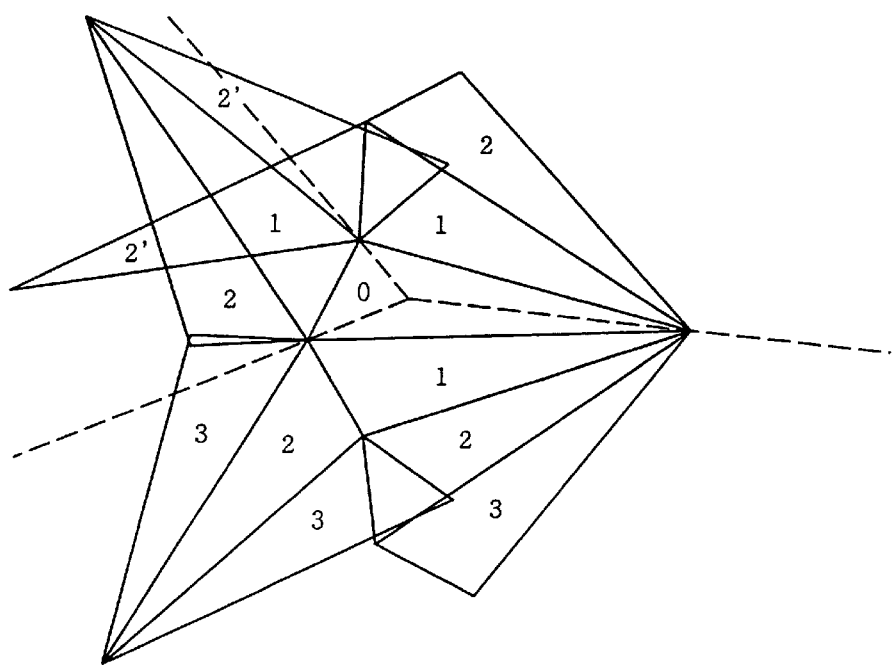
FIG. 9 is a conceptual diagram showing a process of forming a kaleidoscopic image on the basis of a general triangular initial image fragment.

FIG. 9 illustrates this case.

Referring to FIG. 9, an original image 0 has a general triangular shape. When reflection patterns 1 formed by inverting/duplicating the original image 0 along the respective edges thereof are further inverted/duplicated along the respective edges thereof for forming patterns 2, the patterns 1 and 2 disadvantageously have overlapping portions.

Dotted lines in FIG. 9 show boundaries between mirrors.

In the above case, therefore, what kind of processing is performed on the patterns having overlapping portions comes into question.

Figure 10:
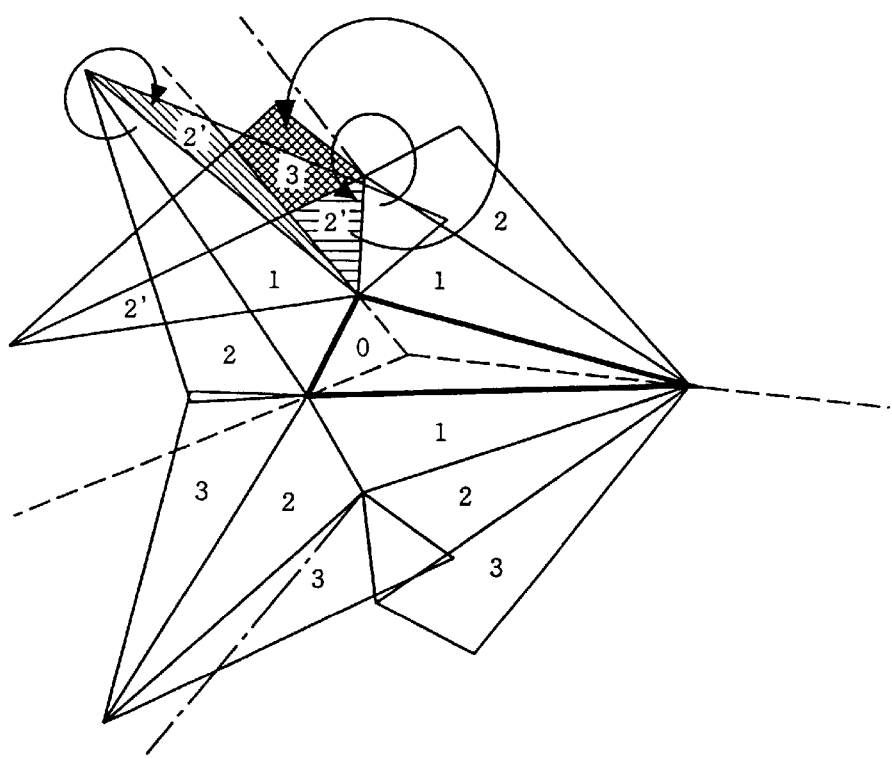
FIG. 10 is a conceptual diagram showing a process of forming the kaleidoscopic image shown in FIG. 9 through an optical process.

FIG. 10 shows a result of processing performed on actual reflection by the mirrors in fidelity through arithmetic processing.

Referring to FIG. 10, the patterns are calculated under the following three rules:

(1) No reflection patterns go across the boundaries between the mirrors.

(2) No patterns having a large number of reflection times cover those having a smaller number of reflection times.

(3) No reflection patterns go across boundaries of reflection.

When such processing is performed, however, it is necessary to calculate reflection on the boundaries between the mirrors one by one for performing processing responsive thereto particularly in relation to the above item (3), and the calculation is complicated.

In order to further simplify the pattern formation, therefore, the following two methods are conceivable: Namely, it is possible to form a kaleidoscopic image also with respect to a general original image shape by performing the following first or second processing.

Figure 11:
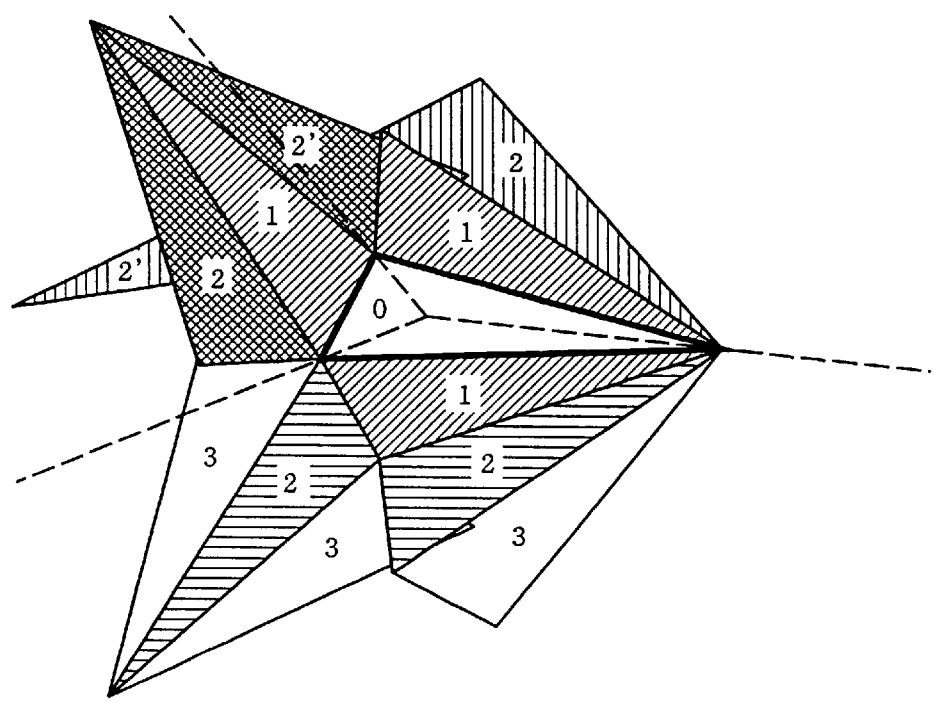
FIG. 11 is a first conceptual diagram showing an operation of the kaleidoscopic image forming unit 104 corresponding to the kaleidoscopic image shown in FIG. 9.

FIG. 11 illustrates exemplary first processing.

The processing shown in FIG. 11 is adapted to display reflection patterns having a small number of reflection times on the assumption that the same are present above those having a large number of reflection times.

This corresponds to a technique of successively incrementing numbers corresponding to patterns caused by invert operations on respective edges and regarding the patterns as numerical values (hereinafter referred to as Z values) expressing depths in rendering (display). When any pattern is inverted and duplicated and there is another pattern having a larger number in a region provided with this pattern, the pattern having a smaller number may be substituted again.

Namely, patterns are successively drawn from those having the smallest Z value in practice. Therefore, substitution is performed only when the Z value of already drawn patterns is larger than that of patterns to be thereafter drawn. Such substitution is performed for every pixel.

Such processing is generally brought into hardware as a Z buffer algorithm in a recent workstation performing graphics processing, and hence extremely high-speed processing can be performed.

The aforementioned processing is performed on patterns having different Z values.

On the other hand, overlap of patterns having equal Z values can be processed in the following method:

Precedence with respect to overlapping is decided depending on the order of drawing patterns. For example, edges of the original pattern are ordered either clockwise or anticlockwise, for forming reflection patterns along the edges in accordance with the order.

Figure 12:
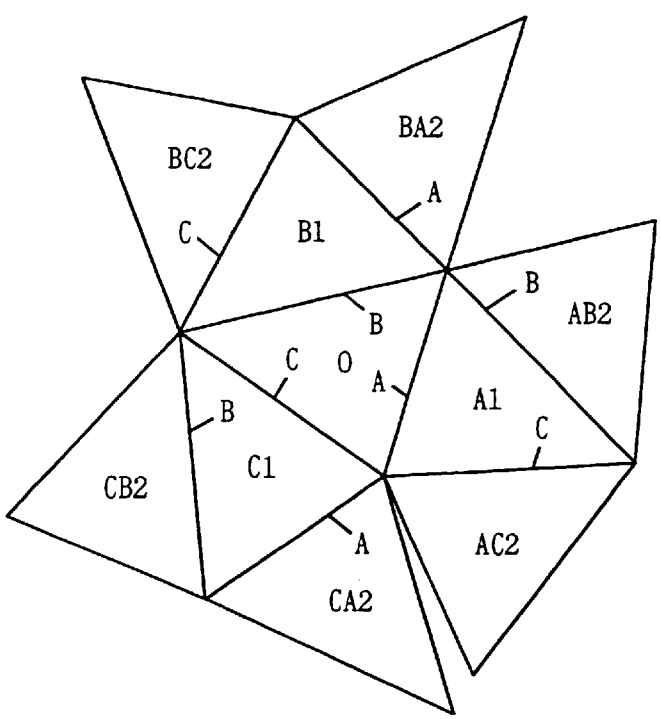
FIG. 12 is a conceptual diagram showing priority assignment in reflection pattern formation.

FIG. 12 is a conceptual diagram showing formation of reflection patterns through such processing up to second reflection patterns. Referring to FIG. 12, it is assumed that the reflection patterns do not overlap with each other, in order to facilitate easy understanding. If any patterns overlap with each other, those to be substituted are decided in accordance with precedence described later.

Figure 13:
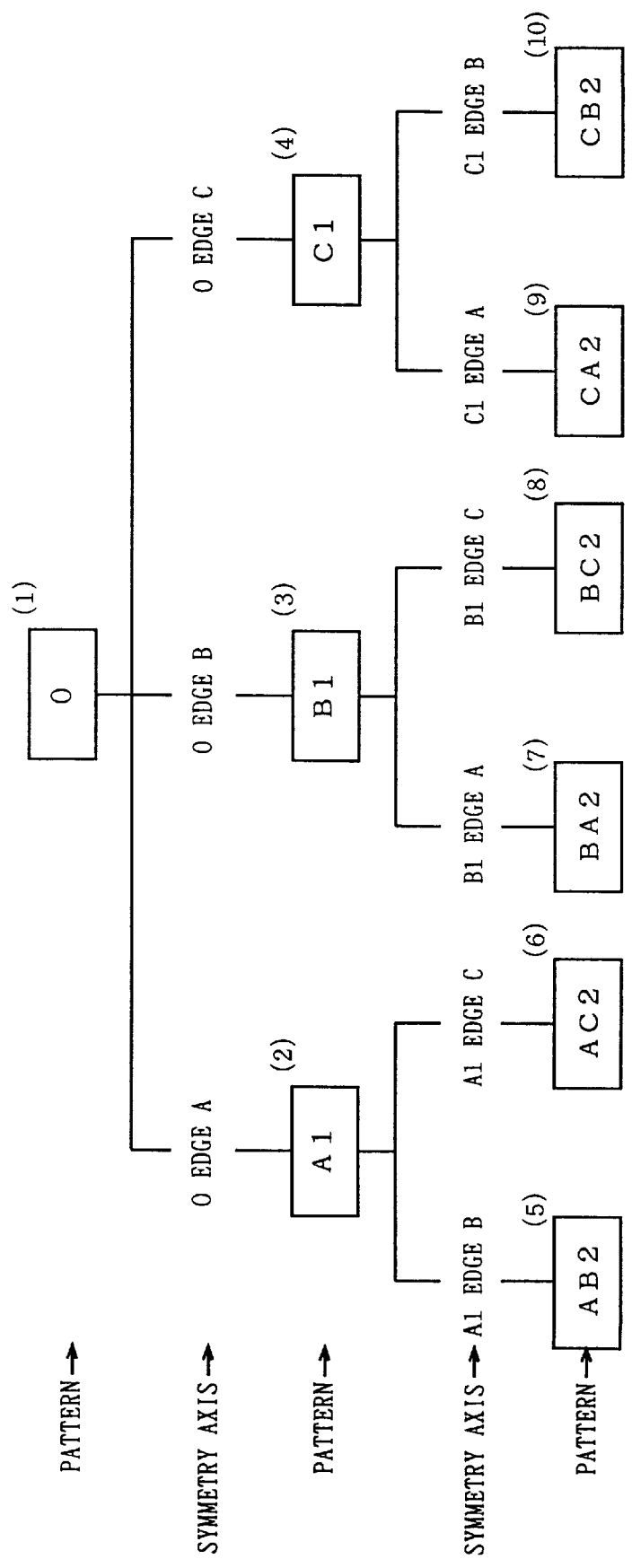
FIG. 13 is a tree diagram showing the algorithm of the reflection pattern formation.

FIG. 13 is a tree diagram showing a process of forming reflection patterns.

Referring to FIGS. 12 and 13, it is assumed that priority is assigned anticlockwise in order of edges A, B and C of a triangular original pattern 0. The edges A to C correspond to mirrors (symmetry axes for inversion) respectively.

A reflection pattern A1 is formed by inverting the original pattern 0 along the edge A defining a symmetry axis. Then, reflection patterns B1 and C1 are formed in this order along the edges B and C defining symmetry axes respectively. It is assumed that priority is assigned to the first reflection patterns A1, B1 and C1 in accordance with the precedence of the edges A, B and C defining the symmetry axes for forming the same.

Therefore, second reflection patterns are formed in order of the reflection patterns A1, B1 and C1. It is assumed that priority is assigned also anticlockwise to the respective edges of the reflection pattern A1. Namely, a reflection pattern AB2 along an edge B of the reflection pattern A1 has precedence over a reflection pattern AC. This also applies to second reflection patterns as to the reflection patterns B1 and C1. Referring to FIG. 13, numerals (1) to (10) represent the precedence decided in the aforementioned manner. Namely, the priority assignment in FIG. 13 corresponds to a lateral priority tree search in a tree structure of loopback (pattern inversion) processing as to edges of respective patterns. It is also possible to consider a vertical priority algorithm, as a matter of course.

In case of patterns having equal Z values, on the other hand, also conceivable is a method of not making substitution but calculating the average of pixel values (brightness, hues etc.) of respective pixels of two (or more) patterns and superposing the same upon overlap of patterns. In this case, a kaleidoscopic image is formed with no regard to the order of drawing.

Figure 14:
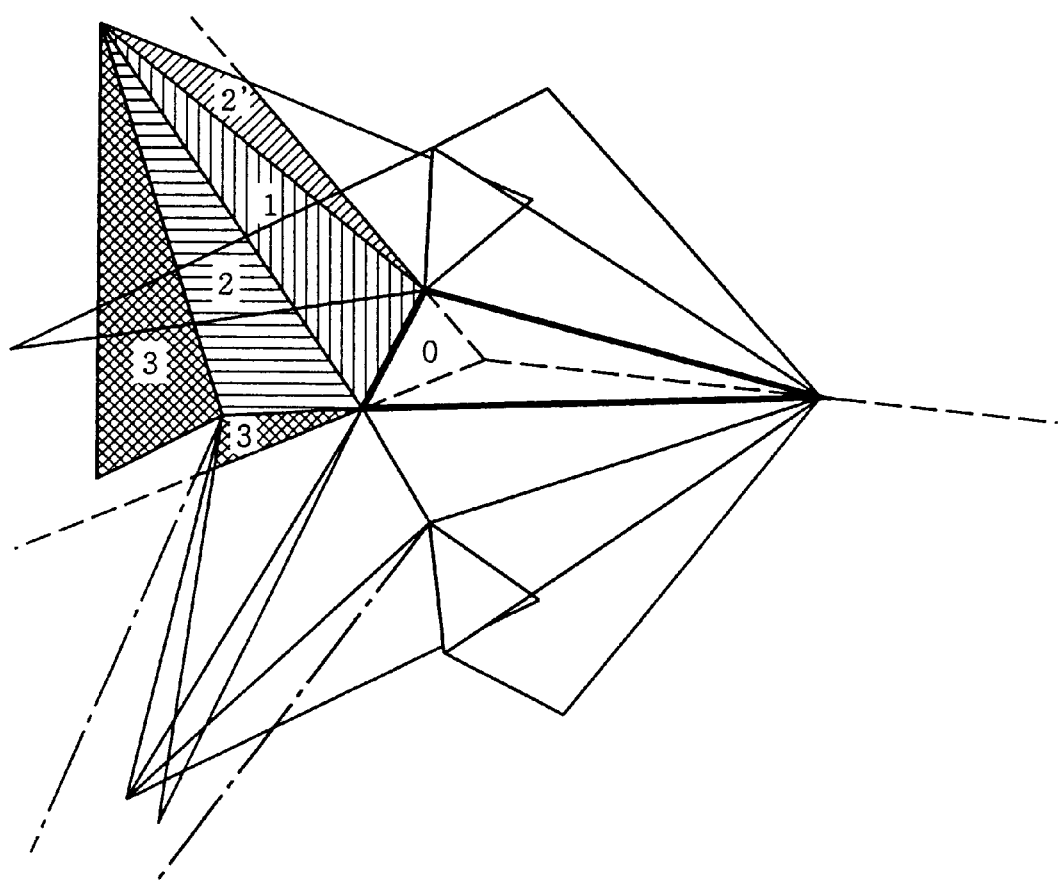
FIG. 14 is a second conceptual diagram showing another operation of the kaleidoscopic image forming unit 104 corresponding to the kaleidoscopic image shown in FIG. 9.

FIG. 14 shows a method of second processing. This method is adapted to operate and form only boundaries between mirrors obtained from initial arrangement with no operation of boundaries of reflection.

It is possible to form a kaleidoscopic image which is closer to an actual image by forming inverted and duplicated patterns under the rule of forming no patterns across the boundaries between the mirrors in such a range.

While the above description has been made on the assumption that the image fragment employed for forming the kaleidoscopic image has a convex shape, the present invention is not restricted to this. Namely, the image fragment may alternatively have a concave shape. More in general, the image fragment may have an arbitrary shape, if a mirror image symmetry axis can be defined. In other words, similar processing can be performed by approximating an arbitrary shape with a polygon.

Embodiment 2

The electronic kaleidoscopic apparatus 100 according to the embodiment 1 is adapted to form only a kaleidoscopic image and project the same on a screen.

An electronic kaleidoscopic apparatus 200 according to an embodiment 2 of the present invention further comprises a sound forming unit 202 for forming sounds in response to patterns of a kaleidoscopic image.

Parts of the electronic kaleidoscopic apparatus 200 identical to those in the embodiment 1 are denoted by the same reference numerals, and redundant description is omitted.

Figure 15:
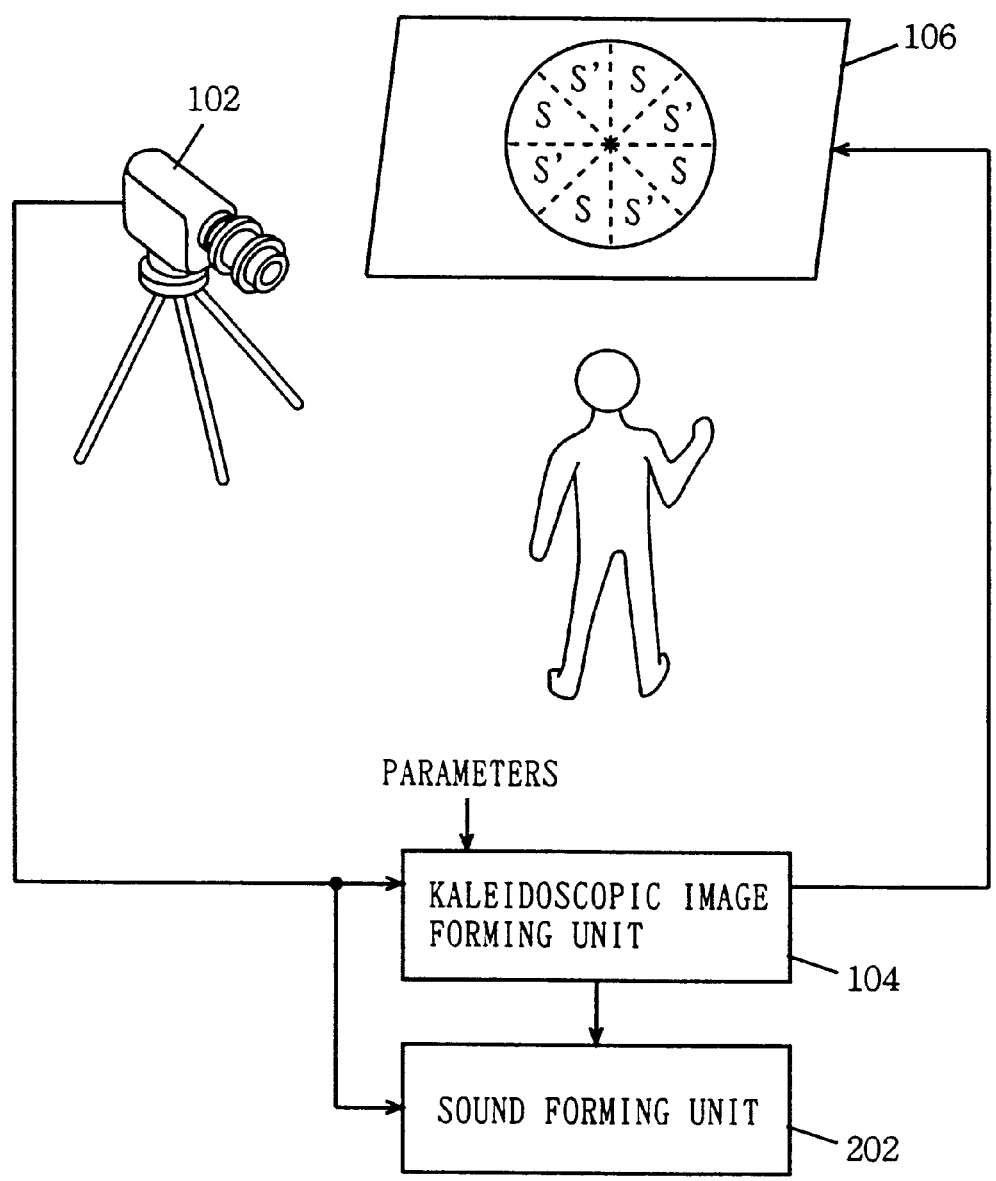
FIG. 15 is a schematic block diagram showing the structure of an electronic kaleidoscopic apparatus 200 according to an embodiment 2 of the present invention.

FIG. 15 is a schematic block diagram showing the structure of the electronic kaleidoscopic apparatus 200 according to the embodiment 2.

Figure 16A:
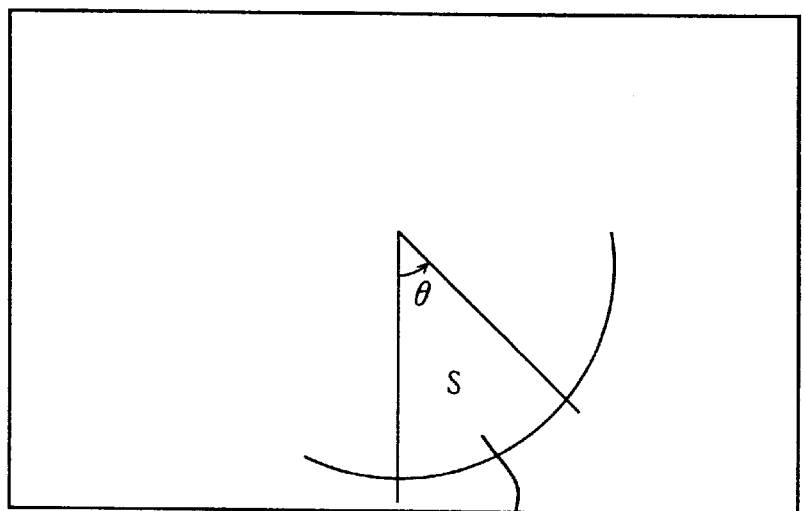
FIGS. 16A and 16B are conceptual diagrams illustrating an operation of a sound forming unit 200.
Figure 16B:
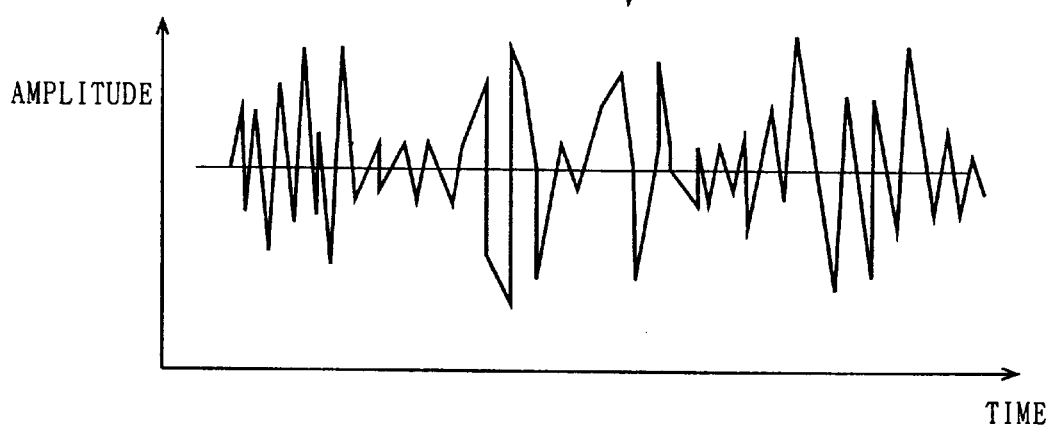

FIGS. 16A and 16B are conceptual diagrams showing processing in the sound forming unit 202 shown in FIG. 15.

The sound forming unit 202 converts a pickup signal in an initial image fragment which is cut out of an image signal inputted from a video camera 102 as an initial image for forming a kaleidoscopic image to a sound fragment corresponding to each pixel, thereby forming continuous sounds. For example, the sound forming unit 202 can convert an image signal to a sound signal by associating a hue and brightness themselves with a tone color and a sound volume respectively and by associating changes of the hue and brightness with the tone color and the sound volume respectively.

Figure 17:
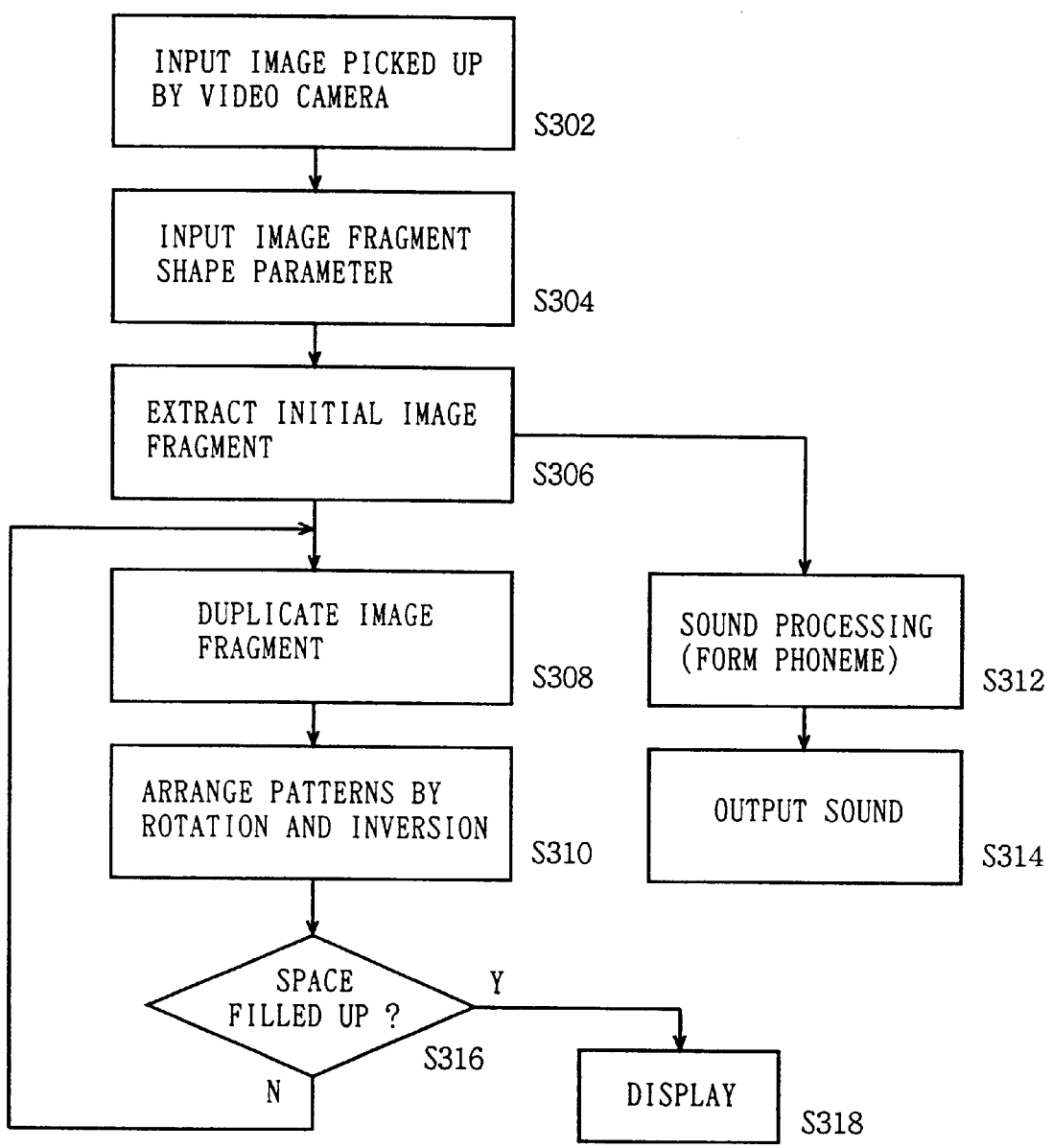
FIG. 17 is a flow chart illustrating operations of a kaleidoscopic image forming unit 104 and the sound forming unit 200.

FIG. 17 is a flow chart illustrating an operation of the electronic kaleidoscopic apparatus 200 shown in FIG. 15.

A kaleidoscopic image forming unit 104 receives image information picked up by the video camera 102 (step S302).

Then, a parameter of an image fragment shape corresponding to an initial image fragment for forming a kaleidoscopic image is inputted from the exterior with respect to the picked-up image information (step S304).

Then, the kaleidoscopic image forming unit 104 cuts the initial image fragment out of a pickup signal in response to the inputted shape parameter of the image fragment (step S306).

The kaleidoscopic image forming unit 104 may extract image information corresponding to the specified image fragment shape from image information of an arbitrary area obtained from the video camera 104, or convert the image information from the video camera 102 to the image fragment shape by morphing.

Then, the kaleidoscopic image forming unit 104 duplicates the image fragment (step S308), and forms and arranges reflection patterns by rotation and inversion (step S310).

On the other hand, the sound forming unit 202 receives information of the extracted initial image fragment and sequentially forms corresponding phonemes from pixel information of the pickup signal (step S312).

Acoustic processing includes both of simple sound processing and sound recognition. In the simple sound processing, the sound forming unit 202 forms the phonemes on the basis of information on the intensity of the brightness, the hue and the like.

In the sound recognition, the sound forming unit 202 recognizes what objects contained in the image are, and selects tone colors of synthesized sounds, an instrument assumed to form the sounds, for example, and the like.

The contents of the acoustic processing are now described in more detail.

The acoustic processing is implemented as follows, for example: First, the sound forming unit 202 divides the image fragment into about 5 to 20 small areas, and checks up the brightness and the hue of every pixel or changes thereof in each small area. When the number of changing pixels exceeds a certain degree in any small area, for example, the sound forming unit 202 determines that the small area is activated. A sound to be outputted from each small area is previously determined as to a chord changing along a certain scale or harmonic progression, and the sound forming unit 202 forms the sound corresponding to the activated small area. In order to form the sound, the sound forming unit 20 may output a MIDI (Musical Instrument Digital Interface) signal for moving an external MIDI instrument. The strength, the tone color etc. of the sound depend on the brightness, the hue and the strength of activation.

The sound forming unit 202 continuously outputs the formed phonemes, thereby forming sounds (step S314).

On the other hand, the kaleidoscopic image forming unit 104 determines whether or not a screen is completely filled up with reflection patterns formed by rotation/inversion (step S316).

If determining that a space is filled up, the kaleidoscopic image forming unit 104 outputs a corresponding image to a display unit 106 (step S318).

If determining that the space is not yet completely filled up (step S316), the processing returns to the step S308 for duplicating the image fragment.

In the aforementioned step S310, a kaleidoscopic image can be formed with respect to a more general shape for the initial image fragment by the method described with reference to FIGS. 11 or 14.

The kaleidoscopic image forming unit 104 continuously repeats the aforementioned kaleidoscopic image forming operation, for outputting a kaleidoscopic image changing in real time to the display unit 106.

Namely, the kaleidoscopic image forming unit 104 repeats the processing from the input of the image by the video camera 104 up to the display shown in the flow chart at a video rate.

As hereinabove described, it is possible to increase the observer's concern or interest by not only forming a kaleidoscopic image from a picked-up image signal but forming a sound signal corresponding thereto.

Embodiment 3

Figure 18:
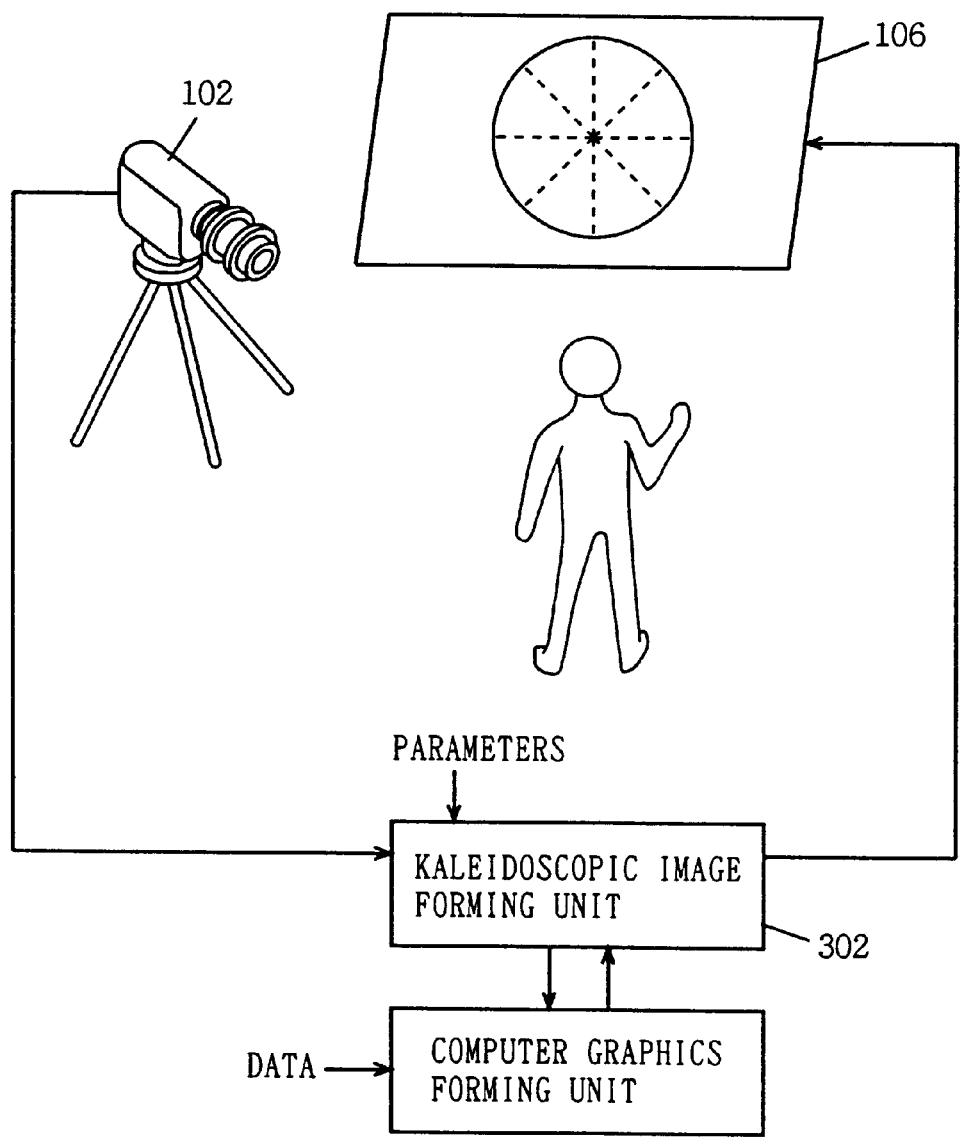
FIG. 18 is a schematic block diagram showing the structure of an electronic kaleidoscopic apparatus 300 according to an embodiment 3 of the present invention.

FIG. 18 is a schematic block diagram showing the structure of an electronic kaleidoscopic apparatus 300 according to an embodiment 3 of the present invention.

This electronic kaleidoscopic apparatus 300 is different from the electronic kaleidoscopic apparatus 100 according to the embodiment 1 in a point that the same comprises a computer graphics forming unit 304 for forming a graphics image, and in a point that a kaleidoscopic image forming unit 302 synthesizes a partial image signal obtained by cutting an initial image fragment out of a pickup signal received from a video camera 102 with the graphics image outputted from the computer graphics forming unit 304 for forming a kaleidoscopic image.

Parts of the electronic kaleidoscopic apparatus 300 identical to those in the embodiment 1 are denoted by the same reference numerals, and redundant description is omitted.

Figure 19:
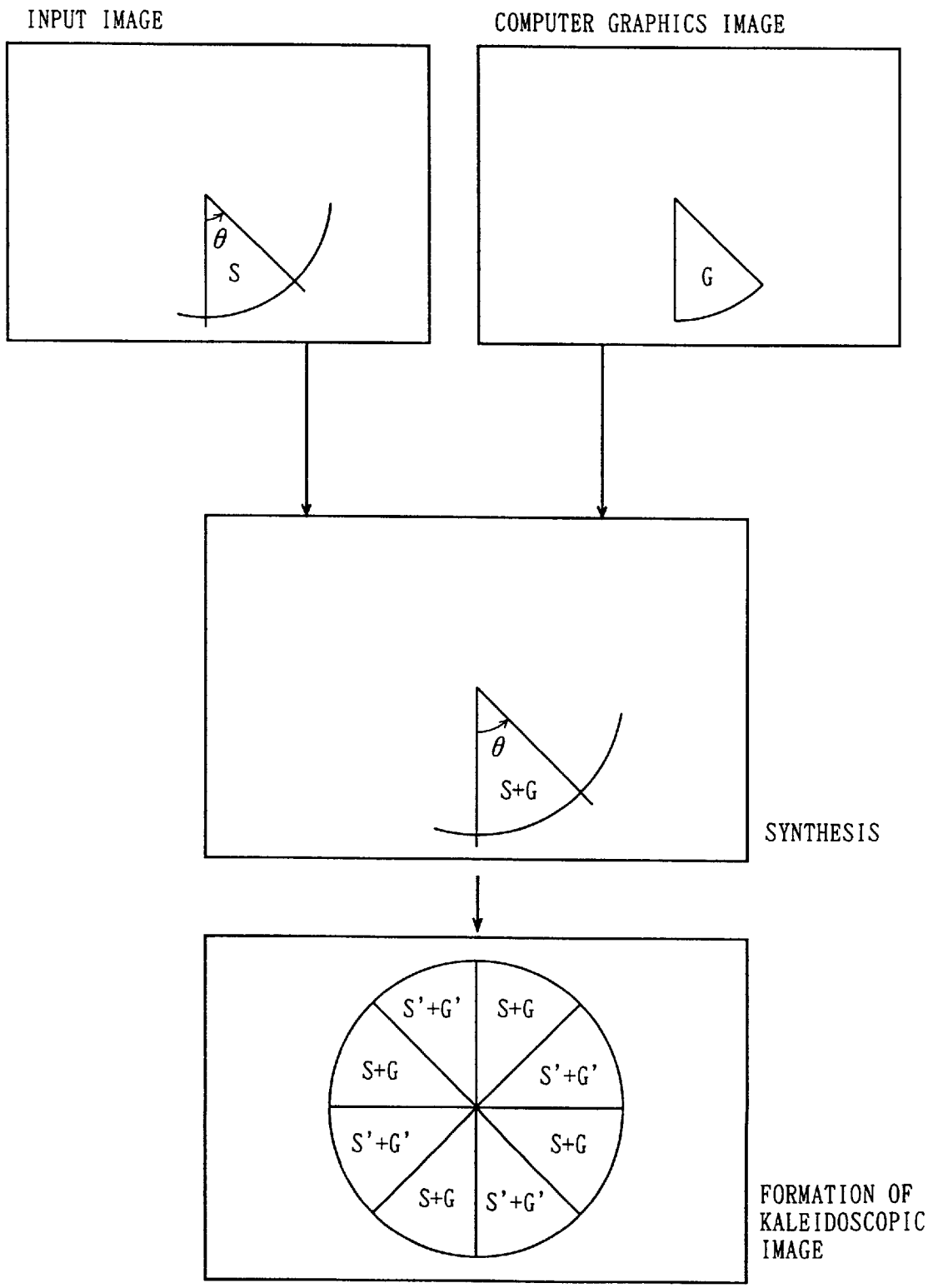
FIG. 19 is a conceptual diagram illustrating operations of a kaleidoscopic image forming unit 302 and a computer graphics forming unit 304.

FIG. 19 is a conceptual diagram illustrating operations of the kaleidoscopic image forming unit 302 and the computer graphics forming unit 304 shown in FIG. 18.

Similarly to the kaleidoscopic image forming unit 104 according to the embodiment 1, the kaleidoscopic image forming unit 302 extracts a specified region S from an image signal supplied from the video camera 102 as an initial image fragment. On the other hand, the computer graphics forming unit 304 forms computer graphics G existing in a region equivalent to the region S.

The kaleidoscopic image forming unit 302 synthesizes the computer graphics G outputted from the computer graphics forming unit 304 with the initial image fragment S. Then, the kaleidoscopic image forming unit 302 regards the synthesized image fragment S+G as an initial image fragment, and forms a kaleidoscopic image in accordance with a procedure similar to that described with reference to FIG. 3.

Figure 20:
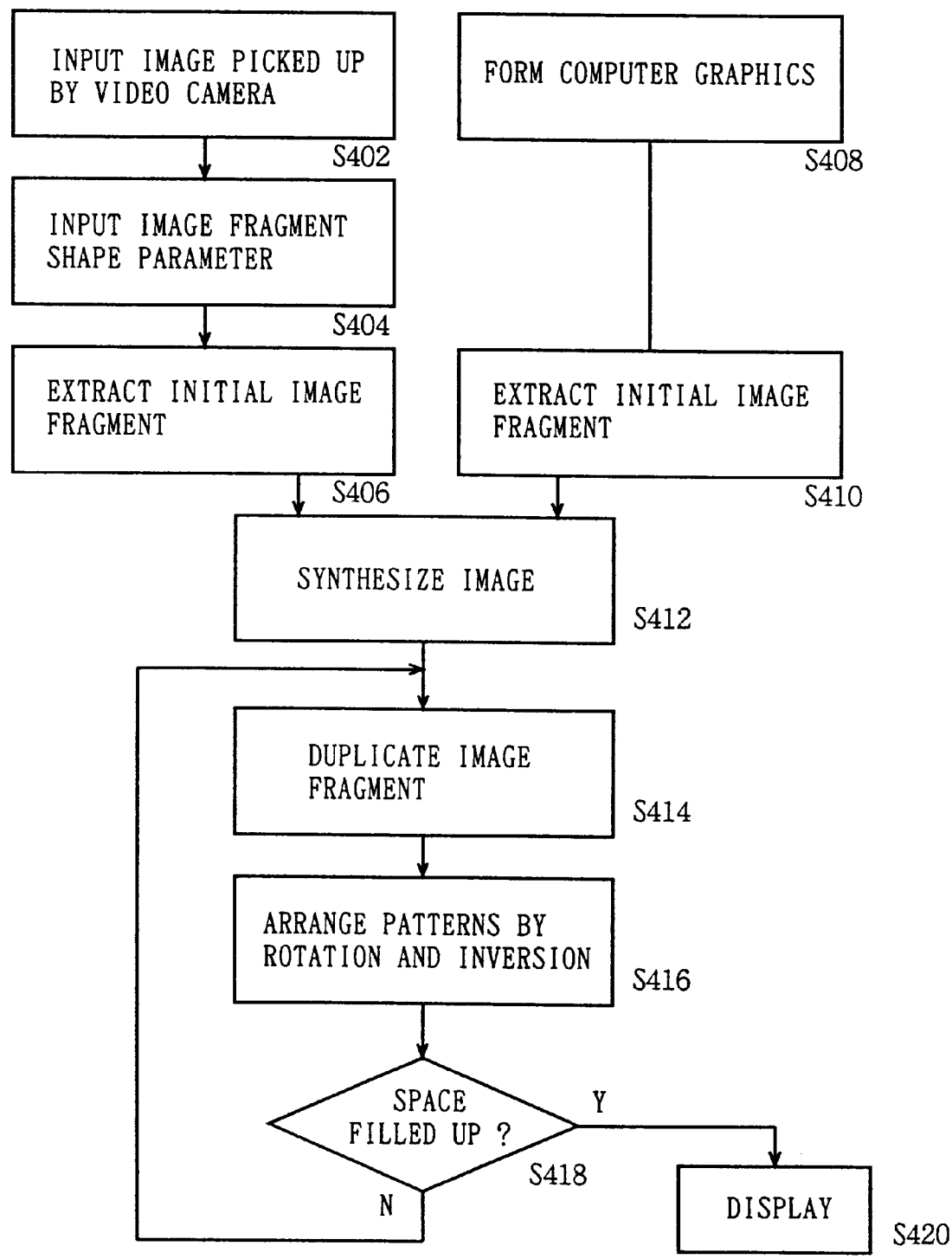
FIG. 20 is a flow chart illustrating the operations of the kaleidoscopic image forming unit 302 and the computer graphics forming unit 304.

FIG. 20 is a flow chart illustrating an operation of the electronic kaleidoscopic apparatus 300.

An image signal picked up by the video camera 102 is inputted in the kaleidoscopic image forming unit 302 (step S402).

Then, the kaleidoscopic image forming unit 302 receives a parameter of an image fragment shape corresponding to an initial image fragment from the exterior (step S404).

Then, the kaleidoscopic image forming unit 302 cuts (extracts) an image signal corresponding to the initial image fragment out of a pickup signal in response to the inputted parameter of the shape of the initial image fragment (step S406).

On the other hand, the computer graphics forming unit 304 forms computer graphics in accordance with externally supplied data (step S408).

Then, the computer graphics forming unit 304 cuts out (extracts) a corresponding region of the computer graphics image in correspondence to the initial image fragment shape on the basis of externally supplied data (step S410).

The kaleidoscopic image forming unit 302 receives the initial image fragment extracted from the pickup signal and an initial image fragment of the computer graphics outputted from the computer graphics forming unit 304, and forms an image by synthesizing the initial image fragments with each other (step S412).

Then, the kaleidoscopic image forming unit 302 duplicates the synthesized image as an initial image fragment (step S414).

Further, the kaleidoscopic image forming unit 302 arranges reflection patterns corresponding to the image fragment by rotation and inversion (step S416).

Then, the kaleidoscopic image forming unit 302 determines whether or not a space is completely filled up (step S418), and outputs a corresponding image signal to a display unit 106 if the determination is of YES (step S420).

If determining that the space is not yet completely filled up (step S418), the processing returns to the step S414 of duplicating the image fragment.

As hereinabove described, it is possible to form a kaleidoscopic image having a more complex shape by synthesizing not only image information picked up by the video camera 102 but an image signal formed by the computer graphics forming unit 304.

It is possible to form a kaleidoscopic image with respect to a more general initial image fragment shape by performing the processing described with reference to FIG. 11 or 14 in the arrangement of reflection patterns by rotation and inversion in the step S416 shown in FIG. 20.

Further, it is possible to output a sound signal corresponding to a kaleidoscopic image by adding a sound forming unit for converting an image signal of an initial image fragment to phonemes for every signal corresponding to a pixel, similarly to that described with reference to the embodiment 2.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic kaleidoscopic apparatus comprising:

image pickup means for converting a picked-up optical image to a pickup signal;

kaleidoscopic image forming means for receiving said pickup signal and forming an image signal of a kaleidoscopic pattern, said kaleidoscopic image forming means including:

image extracting means for receiving said pickup signal and cutting a partial pickup signal corresponding to a specific polygonal region in the picked-up scene out of said pickup signal in accordance with an external instruction, and image processing means for successively repeating a step of forming a mirror image by inverting/duplicating an original image of said partial pickup signal along each edge, defining a mirror image symmetry axis, of said polygonal region with respect to said mirror image formed in each said step thereby forming said image signal of said kaleidoscopic pattern filling up a screen; and display means for outputting a corresponding image in response to an output of said kaleidoscopic image forming means, further comprising sound means for receiving said partial pickup signal and successively forming and outputting a sound of a corresponding tone color and a corresponding volume on the basis of the brightness and the hue of said pickup signal.

2. The electronic kaleidoscopic apparatus in accordance with claim 1, wherein said image processing means substitutes said mirror image formed in each said step of forming said mirror image by inversion/duplication along each said edge, defining said mirror image symmetry axis, of said polygonal region with respect to said mirror image formed at a step preceding said step thereby forming said image signal of said kaleidoscopic pattern filling up said screen.

3. The electronic kaleidoscopic apparatus in accordance with claim 1, wherein said image processing means successively repeats a step of forming a mirror image by inversion/duplication along each edge, defining a mirror image symmetry axis, of said polygonal region with respect to said mirror image formed in each said step through boundaries between mirrors decided by only initial arrangement of said polygonal region thereby forming said image signal of said kaleidoscopic pattern filling up said screen.

4. An electronic kaleidoscopic apparatus comprising:

image pickup means for converting a picked-up optical image to a pickup signal;

kaleidoscopic image forming means for receiving said pickup signal and forming an image signal of a kaleidoscopic pattern said kaleidoscopic image forming means including:

image extracting means for receiving said pickup signal and cutting a partial pickup signal corresponding to a specific polygonal region in the picked-up scene out of said pickup signal in accordance with an external instruction, and image processing means for successively repeating a step of forming a mirror image by inverting/duplicating an original image of said partial pickup signal along each edge, defining a mirror image symmetry axis, of said polygonal region with respect to said mirror image formed in each said step thereby forming said image signal of said kaleidoscopic pattern filling up a screen; and display means for outputting a corresponding image in response to an output of said kaleidoscopic image forming means, wherein said image extracting means includes:

partial image specifying means for receiving said pickup signal and cutting out said partial pickup signal corresponding to said specified polygonal region in the picked-up scene in accordance with said external instructions, and image synthesis means for receiving an output of said partial image specifying means and forming a partial pickup signal by synthesizing a graphics image formed in response to an external instruction with said cut-out partial pickup signal.

5. The electronic kaleidoscopic apparatus in accordance with claim 4, wherein said image processing means substitutes said mirror image formed in each said step of forming said mirror image by inversion/duplication along each said edge, defining said mirror image symmetry axis, of said polygonal region with respect to said mirror image formed at a step preceding said step thereby forming said image signal of said kaleidoscopic pattern filling up said screen.

6. The electronic kaleidoscopic apparatus in accordance with claim 4, wherein said image processing means successively repeats a step of forming a mirror image by inversion/duplication along each edge, defining a mirror image symmetry axis, of said polygonal region through only a boundary between mirrors decided by initial arrangement of said polygonal region with respect to said mirror image formed in each said step thereby forming said image signal of said kaleidoscopic pattern filling up said screen.

7. The electronic kaleidoscopic apparatus in accordance with claim 4, further comprising sound means for receiving said partial pickup signal and successively forming and outputting a sound of a corresponding tone color and a corresponding volume on the basis of the brightness and the hue of said pickup signal.

8. An electronic kaleidoscopic apparatus comprising:

image pickup means for converting a picked-up optical image to a pickup signal;

kaleidoscopic image forming means for receiving said pickup signal and forming an image signal of a kaleidoscopic pattern, said kaleidoscopic image forming means including:

image extracting means for receiving said pickup signal and cutting a partial pickup signal corresponding to a specified angle region about a specified central point in the picked-up scene out of said pickup signal in accordance with an external instruction, and image processing means for successively inverting/duplicating an original image of said partial pickup signal along an edge, defining a mirror image symmetry axis, in a prescribed rotational direction about said central point along said prescribed rotational direction thereby forming said image signal of said kaleidoscopic pattern filling up a screen; and display means for outputting a corresponding image in response to an output of said kaleidoscopic image forming means, wherein said image extracting means includes:
partial image specifying means for receiving said pickup signal and cutting out said partial pickup signal corresponding to said specified angle region about said specified central point in the picked-up scene in accordance with said external instructions, and
image synthesis means for receiving an output of said image extracting means and synthesizing a graphic image formed in response to an external instruction with said cut-out partial pickup signal for forming a partial pickup signal.

9. An electronic kaleidoscopic apparatus comprising:

image pickup means for converting a picked-up optical image to a pickup signal;

kaleidoscopic image forming means for receiving said pickup signal and forming an image signal of a kaleidoscopic pattern, said kaleidoscopic image forming means including:
image extracting means for receiving said pickup signal and cutting a partial pickup signal corresponding to a specified angle region about a specified central point in the picked-up scene out of said pickup signal in accordance with an external instruction, and
image processing means for successively inverting/duplicating an original image of said partial pickup signal along an edge, defining a mirror image symmetry axis, in a prescribed rotational direction about said central point along said prescribed rotational direction thereby forming said image signal of said kaleidoscopic pattern filling up a screen; and
display means for outputting a corresponding image in response to an output of said kaleidoscopic image forming means,
further comprising sound means for receiving said partial pickup signal and successively forming and outputting a sound of a corresponding tone color and a corresponding volume on he basis of the brightness and the hue of said pickup signal.

\* \* \* \* \*